(12) United States Patent
Zhai

(10) Patent No.: US 10,813,051 B2
(45) Date of Patent: Oct. 20, 2020

(54) POWER MANAGEMENT METHOD AND TERMINAL DEVICE

(71) Applicant: HUAWEI TECHNOLOGIES CO., LTD., Shenzhen (CN)

(72) Inventor: Yibin Zhai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/343,413

(22) PCT Filed: Dec. 30, 2016

(86) PCT No.: PCT/CN2016/113957
§ 371 (c)(1),
(2) Date: Apr. 19, 2019

(87) PCT Pub. No.: WO2018/072338
PCT Pub. Date: Apr. 26, 2018

(65) Prior Publication Data
US 2019/0253974 A1   Aug. 15, 2019

(30) Foreign Application Priority Data

Oct. 19, 2016   (CN) .......................... 2016 1 0913813

(51) Int. Cl.
*H04W 52/02*   (2009.01)
*H04W 40/10*   (2009.01)
(Continued)

(52) U.S. Cl.
CPC .......... *H04W 52/0264* (2013.01); *G06F 1/32* (2013.01); *G06F 9/445* (2013.01); *H04W 88/02* (2013.01)

(58) Field of Classification Search
None
See application file for complete search history.

(56) References Cited

U.S. PATENT DOCUMENTS 8,805,764 B1 * 8/2014 Rhines .................. G06F 1/3209
706/46
2010/0273486 A1 * 10/2010 Kharia .............. H04W 52/0261
455/436

(Continued)

FOREIGN PATENT DOCUMENTS

CN           1909694 A    2/2007
CN         103176840 A    6/2013
(Continued)

*Primary Examiner* — San Htun
(74) *Attorney, Agent, or Firm* — Kilpatrick Townsend & Stockton LLP

(57) ABSTRACT

A power management method and a terminal device are provided, so as to prevent an ongoing service from being affected because of power saving. The method includes: receiving, by a terminal device, a first operation, where the first operation is used to invoke a first application program; querying, by the terminal device, an association relationship between a power range and an application program, so as to determine whether the first application program to be invoked in response to the first operation is an available application program associated with a power range to which current remaining power of the terminal device belongs; and skipping invoking, by the terminal device, the first application program if the first application program is not an available application program associated with the power range to which the current remaining power belongs.

11 Claims, 8 Drawing Sheets

(51) Int. Cl.
*G06F 1/32* (2019.01)
*G06F 9/445* (2018.01)
*H04W 88/02* (2009.01)

(56) References Cited

U.S. PATENT DOCUMENTS

| | | | | |
|---|---|---|---|---|
| 2011/0072292 | A1* | 3/2011 | Khawand | G06F 1/3203 713/340 |
| 2012/0083258 | A1* | 4/2012 | Rabii | H04W 52/0261 455/418 |
| 2014/0045436 | A1* | 2/2014 | Gutierrez, Jr. | H04W 52/0296 455/67.11 |
| 2015/0056947 | A1* | 2/2015 | Panchal | H04W 52/267 455/405 |
| 2016/0253187 | A1* | 9/2016 | Kim | G06F 9/4893 719/320 |
| 2016/0366648 | A1* | 12/2016 | Bostick | H04W 52/0258 |

FOREIGN PATENT DOCUMENTS

| | | |
|---|---|---|
| CN | 103905652 A | 7/2014 |
| CN | 104166453 A | 11/2014 |
| CN | 104765269 A | 9/2015 |
| CN | 104898409 A | 9/2015 |
| CN | 105573472 A | 5/2016 |
| CN | 105700663 A | 6/2016 |
| CN | 105786560 A | 7/2016 |
| CN | 105824659 A | 8/2016 |

\* cited by examiner

POWER MANAGEMENT METHOD AND TERMINAL DEVICE

CROSS-REFERENCE TO RELATED APPLICATIONS

This application is a National Stage of International Application No. PCT/CN2016/113957, filed on Dec. 30, 2016, which claims priority to Chinese Patent Application No. 201610913813.9, filed with the Chinese Patent Office on Oct. 19, 2016 and entitled "MOBILE TERMINAL POWER SAVING METHOD AND DEVICE". Both of the aforementioned applications are hereby incorporated by reference in their entireties.

TECHNICAL FIELD

The present invention relates to the field of computer technologies, and in particular, to a power management method and a terminal device.

BACKGROUND

Currently, when power of a terminal device is lower than a specified threshold, some terminal devices, such as a mobile phone, send out an alarm sound, or may remind a user whether to perform an operation of "entering a power saving mode". If the user determines to enter the power saving mode, the mobile phone disables all related application programs based on a specified rule, and only some relatively key functions are reserved.

It can be learned that the current power saving mode is a post-event processing mode, that is, processing is performed only when power is extremely low. Consequently, a power saving effect is limited because a power consumption behavior has occurred.

SUMMARY

Embodiments of the present invention provide a power management method and a terminal device, so as to prevent an ongoing service from being affected because of power saving.

According to a first aspect, a power management method is provided, and the method is performed by a terminal device. The method includes: receiving, by the terminal device, a first operation, where the first operation is used to invoke a first application program; querying, by the terminal device, an association relationship between a power range and an application program, so as to determine whether the first application program to be invoked in response to the first operation is an available application program associated with a power range to which current remaining power of the terminal device belongs; and skipping invoking, by the terminal device, the first application program when the first application program is not an available application program associated with the power range to which the current remaining power belongs.

In this embodiment of the present invention, the association relationship between a power range and an application program may be preset. After receiving the first operation, the terminal device determines whether the first application program to be invoked by the first operation is an available application program associated with the power range to which the current remaining power belongs. The terminal device refuses to invoke the first application program if the first application program to be invoked by the first operation is not an available application program associated with the power range to which the current remaining power belongs. That is, a possibility of running a power-intensive application program can be fundamentally eliminated. Application programs may be managed based on a specified association relationship when power is relatively sufficient, so as to effectively arrange running of the application programs, and prolong a battery life of the terminal device in a whole process.

With reference to the first aspect, in a first possible implementation of the first aspect, before the skipping invoking, by the terminal device, the first application program, the method further includes: outputting, by the terminal device, first prompt information; and receiving, by the terminal device, an input operation for the first prompt information, where the first prompt information is used to provide a prompt about whether to give up invoking the first application program. In this case, the skipping invoking, by the terminal device, the first application program includes: skipping invoking, by the terminal device, the first application program when the input operation is used to instruct to give up invoking the first application program.

It is most important for the terminal device to meet a user requirement. Therefore, if the terminal device considers that the first application program does not need to be invoked, the terminal device may query a user first. If the user determines to give up invoking the first application program, then the terminal device further determines to skip invoking the first application program. This reduces power consumption and meets the user requirement. However, if the user determines to continue to invoke the first application program, the terminal device may continue to invoke the first application program, so as to meet the user requirement as much as possible and improve user experience. In addition, the terminal device outputs the first prompt information, so that the user learns that it is improper to invoke the first application program currently. Even if the user determines to continue to invoke the first application program, the user may moderately invoke the first application program so as not to consume too much power, or may determine to charge the terminal device in a timely manner. That is, outputting the first prompt information can well remind the user. Therefore, practicability of the terminal device is improved.

With reference to the first aspect or the first possible implementation of the first aspect, in a second possible implementation of the first aspect, the method further includes: dividing, by the terminal device, power of the terminal device into at least one power range; and associating, by the terminal device, at least one application program with each of the at least one power range, so as to constitute the association relationship. A minimum power value included in the at least one power range is minimum power that can be supported by the terminal device, and a maximum power value included in the at least one power range is maximum power that can be supported by the terminal device.

The terminal device determines, based on the association relationship between a power range and an application program, whether to invoke an application program. Therefore, the terminal device may establish the association relationship between a power range and an application program in advance. In this way, when needing to invoke an application program, the terminal device may directly perform determining based on the established association relationship, so that a subsequent process of determining whether the application program can be invoked becomes extremely simple.

With reference to the first aspect, the first possible implementation of the first aspect, or the second possible implementation of the first aspect, in a third possible implementation of the first aspect, the method further includes: invoking, by the terminal device, the first application program when the first application program is an available application program associated with the power range to which the current remaining power belongs.

If the first application program is an available application program associated with the power range to which the current remaining power belongs, it indicates that the power is sufficient to run the first application program, and the first application program can be invoked. In this case, the terminal device directly invokes the first application program, so that the user can normally use the first application program.

With reference to any one of the first aspect or the first to the third possible implementations of the first aspect, in a fourth possible implementation of the first aspect, the method further includes: determining, by the terminal device, that remaining power of the terminal device enters a second power range included in the association relationship from a first power range included in the association relationship; and outputting, by the terminal device, second prompt information when a second application program running on the terminal device is not an available application program associated with the second power range, where the second prompt information is used to provide a prompt about whether to disable the second application program.

When the terminal device invokes the second application program, the second application program may be an available application program associated with the power range to which the current remaining power of the terminal device belongs, so that the terminal device normally invokes the second application program. However, after the second application program runs for a period of time, the power of the terminal device decreases, and remaining power of the terminal device may enter the second power range. The second application program is not an available application program associated with the second power range. In this case, the terminal device may directly stop running the second application program, so as to avoid affecting subsequent use of the user because power is consumed excessively fast due to running of the second application program. Alternatively, the terminal device may temporarily not stop running the second application program, but output the second prompt information, that is, the terminal device may first query the user. If the user determines to give up invoking the second application program, the terminal device further determines to skip invoking the second application program. This reduces power consumption and meets the user requirement. However, if the user determines to continue to invoke the second application program, the terminal device may continue to invoke the second application program, so as to meet the user requirement as much as possible and improve user experience. In addition, the terminal device outputs the second prompt information, so that the user learns that it is improper to invoke the second application program currently. Even if the user determines to continue to invoke the second application program, the user may moderately invoke the second application program so as not to consume too much power, or may determine to charge the terminal device in a timely manner. That is, outputting the second prompt information can well remind the user. Therefore, practicability of the terminal device is improved.

According to a second aspect, a power management method is provided, and the method is performed by a terminal device. The method includes: receiving, by the terminal device, a second operation, where the second operation is used to update a system or an application program installed on the terminal device; determining, by the terminal device, whether the terminal device is in a charging state; and skipping responding, by the terminal device, to the second operation when the terminal device is not in the charging state.

The second operation is an update operation, and the update operation usually consumes much power. If the terminal device is not in the charging state, power of the terminal device may be consumed excessively fast when the second operation is responded to, and subsequent use of the user is affected. In addition, usually duration of the update operation is relatively long. Therefore, if the terminal device is shut down before completing responding to the second operation because power runs out when the second operation is responded to, an update is not completed, and a system or corresponding software likely becomes faulty. Therefore, to avoid these problems, if the terminal device receives the update operation, the terminal device may determine whether the terminal device is in the charging state. If the terminal device is not in the charging state, the terminal device may not respond to the second operation, so as to avoid excessive power consumption.

With reference to the second aspect, in a first possible implementation of the second aspect, before the skipping responding, by the terminal device, to the second operation, the method further includes: determining, by the terminal device, whether a difference between remaining power of the terminal device and power required for responding to the second operation is less than a preset threshold, where the preset threshold is a safe power value of the terminal device. In this case, the skipping responding, by the terminal device, to the second operation includes: skipping responding, by the terminal device, to the second operation when the difference between the remaining power of the terminal device and the power required for performing the second operation is less than the preset threshold.

Generally, for an update operation, the terminal device may learn about in advance power required for responding to such an operation. Learning herein may not be accurate learning, and only an approximate value is required. After an operation is received, the user certainly prefers to execute the operation. Therefore, if the terminal device is not in the charging state, the terminal device may further determine whether the difference between the remaining power of the terminal device and the power required for responding to the second operation is less than the preset threshold. If the difference between the remaining power of the terminal device and the power required for responding to the second operation is less than the preset threshold, it indicates that the terminal device cannot normally respond to the second operation. For example, abnormal shutdown is likely caused because the terminal device responds to the second operation. In this case, the terminal device further determines to skip responding to the second operation, so as to protect the terminal device.

With reference to the first possible implementation of the second aspect, in a second possible implementation of the second aspect, the method further includes: responding, by the terminal device, to the second operation when the difference between the remaining power of the terminal device and the power required for performing the second operation is greater than or equal to the preset threshold.

If the difference between the remaining power of the terminal device and the power required for responding to the second operation is greater than or equal to the preset threshold, it indicates that the terminal device can still normally respond to the second operation. Therefore, the terminal device may determine to respond to the second operation, and this is equivalent to normally completing work of the terminal device.

With reference to the second aspect, in a third possible implementation of the second aspect, the method further includes: responding, by the terminal device, to the second operation when the terminal device is in the charging state.

If the terminal device is in the charging state, it is considered that power is relatively sufficient to meet a requirement of responding to the second operation, so that the terminal device can normally respond to the second operation, so as to normally implement a function of the terminal device.

According to a third aspect, a terminal device is provided, where the terminal device includes an input unit and a processor. The input unit is configured to receive a first operation, where the first operation is used to invoke a first application program. The processor is configured to query an association relationship between a power range and an application program, so as to determine whether the first application program to be invoked in response to the first operation is an available application program associated with a power range to which current remaining power of the terminal device belongs. In addition, the processor skips invoking the first application program when the first application program is not an available application program associated with the power range to which the current remaining power belongs.

With reference to the third aspect, in a first possible implementation of the third aspect, the terminal device further includes a display unit or a loudspeaker. The display unit or the loudspeaker is configured to output first prompt information before the processor skips invoking the first application program, where the first prompt information is used to provide a prompt about whether to give up invoking the first application program. The input unit is further configured to receive an input operation for the first prompt information output by the display unit or the loudspeaker. That the processor is configured to skip invoking the first application program includes: refusing to invoke the first application program when the input operation received by the input unit is used to instruct to give up invoking the first application program.

With reference to the third aspect or the first possible implementation of the third aspect, in a second possible implementation of the third aspect, the processor is further configured to divide power of the terminal device into at least one power range, and associate at least one application program with each of the at least one power range, so as to constitute the association relationship. A minimum power value included in the at least one power range is minimum power that can be supported by the terminal device, and a maximum power value included in the at least one power range is maximum power that can be supported by the terminal device.

With reference to the third aspect, the first possible implementation of the third aspect, or the second possible implementation of the third aspect, in a third possible implementation of the third aspect, the processor is further configured to invoke the first application program when the first application program is an available application program associated with the power range to which the current remaining power belongs.

With reference to any one of the third aspect, or the first to the third possible implementations of the third aspect, in a fourth possible implementation of the third aspect, the terminal device further includes a display unit or a loudspeaker. The processor is further configured to determine that remaining power of the terminal device enters a second power range included in the association relationship from a first power range included in the association relationship. The display unit or the loudspeaker is configured to output second prompt information when a second application program running on the terminal device is not an available application program associated with the second power range, where the second prompt information is used to provide a prompt about whether to disable the second application program.

According to a fourth aspect, a terminal device is provided, where the terminal device includes an input unit and a processor. The input unit is configured to receive a second operation, where the second operation is used to update a system or an application program installed on the terminal device. The processor is configured to determine whether the terminal device is in a charging state, and skip responding to the second operation when the terminal device is not in the charging state.

With reference to the fourth aspect, in a first possible implementation of the fourth aspect, the processor is further configured to: before skipping responding to the second operation, determine whether a difference between remaining power of the terminal device and power required for responding to the second operation is less than a preset threshold, where the preset threshold is a safe power value of the terminal device. That the processor is configured to skip responding to the second operation includes: skipping responding to the second operation when the difference between the remaining power of the terminal device and the power required for performing the second operation is less than the preset threshold.

With reference to the first possible implementation of the fourth aspect, in a second possible implementation of the fourth aspect, the processor is further configured to respond to the second operation when the difference between the remaining power of the terminal device and the power required for performing the second operation is greater than or equal to the preset threshold.

With reference to the fourth aspect, in a third possible implementation of the fourth aspect, the processor is further configured to respond to the second operation when the terminal device is in the charging state.

According to a fifth aspect, a terminal device is provided, where the terminal device includes a module configured to perform the method according to any one of the first aspect or the possible implementations of the first aspect.

According to a sixth aspect, a terminal device is provided, where the terminal device includes a module configured to perform the method according to any one of the second aspect or the possible implementations of the second aspect.

According to a seventh aspect, a computer storage medium is provided and is configured to store a computer software instruction used by the foregoing terminal device entity, and the computer software instruction includes a program that is designed for the terminal device entity and that is used to execute any one of the first aspect or the possible implementations of the first aspect.

According to an eighth aspect, a computer storage medium is provided and is configured to store a computer software instruction used by the foregoing terminal device entity, and the computer software instruction includes a program that is designed for the terminal device entity and that is used to execute any one of the second aspect or the possible implementations of the second aspect.

In the embodiments of the present invention, a possibility of running a power-intensive application program can be fundamentally eliminated. Application programs may be managed based on a specified association relationship when power is relatively sufficient, so as to effectively arrange running of the application programs, and prolong a battery life of the terminal device in a whole process.

DESCRIPTION OF EMBODIMENTS

To make the purpose, technical solutions, and advantages of the embodiments of the present invention clearer, the following describes the technical solutions of the embodiments of the present invention with reference to the accompanying drawings in the embodiments of the present invention.

In the embodiments of the present invention, a terminal device is a device that provides a user with voice and/or data connectivity, and may include, for example, a handheld device that has a wireless connection function, or a processing device connected to a wireless modem. The terminal device may communicate with a core network by using a radio access network (Radio Access Network, RAN), and exchange voice and/or data with the RAN. The terminal device may include user equipment (user equipment, UE), a wireless terminal device, a mobile terminal device, a subscriber unit (Subscriber Unit), a subscriber station (Subscriber Station), a mobile station (Mobile Station), a mobile station, a remote station (Remote Station), an access point (Access Point, AP), a remote terminal device (Remote Terminal), an access terminal device (Access Terminal), a user terminal device (User Terminal), a user agent (User Agent), a user device (User Device), or the like. For example, the terminal device may include a mobile phone (or referred to as a "cellular" phone), a mobile computer, a tablet computer, a personal digital assistant (Personal Digital Assistant, PDA), a media player, a smart TV, a wearable device (such as a smartwatch, a smart helmet, or a smart band), or a combination of two or more of the foregoing items.

The following further describes the embodiments of the present invention in detail with reference to the accompanying drawings in this specification.

Figure 1A:
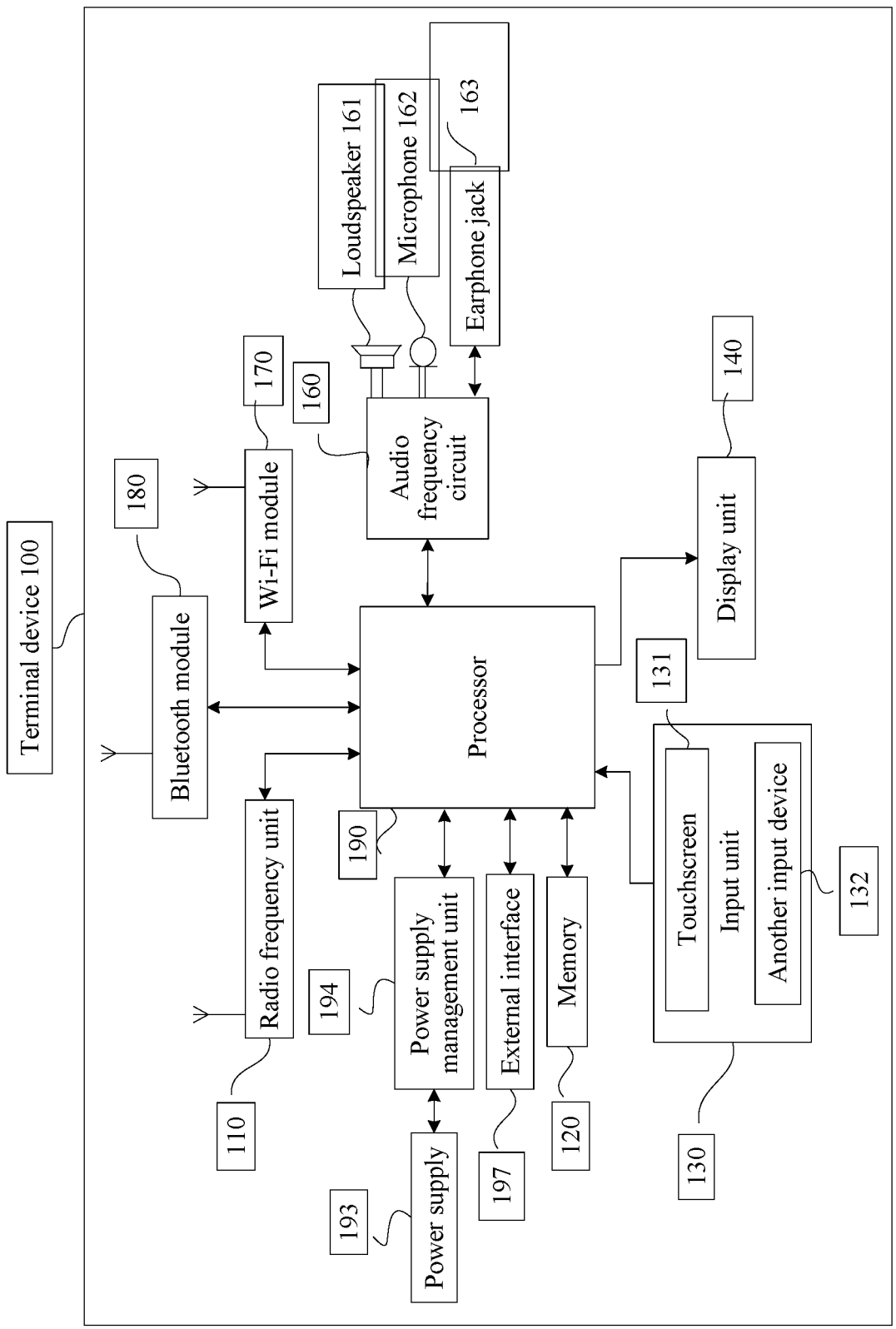
FIG. 1A is a schematic structural diagram of a terminal device according to an embodiment of the present invention.

Referring to FIG. 1A, an embodiment of the present invention provides a terminal device 100. FIG. 1A shows a block diagram of the terminal device 100 according to some embodiments. The terminal device 100 may include a processor 190 and a power supply management unit 194.

In addition, to further improve functions of the terminal device, the terminal device 100 may further include an input unit 130, a display unit 140, a memory 120, a radio frequency unit 110, an audio frequency circuit 160, a loudspeaker 161, a microphone 162, a Wireless Fidelity (Wireless Fidelity, Wi-Fi) module 170, a Bluetooth module 180, a power supply 193, an external interface 197, and the like.

A person skilled in the art may understand that FIG. 1A is merely an example of the terminal device, and imposes no limitation on the terminal device. The terminal device may include more or fewer components than those shown in the figure, or may combine some components, or may have different components.

The processor 190 is a control center of the terminal device 100, is connected to all parts of the entire terminal device 100 by using various interfaces and lines, and implements various functions and data processing of the terminal device 100 by running or executing an instruction stored in the memory 120 and by invoking data stored in the memory 120, so as to perform overall monitoring on the terminal device. Optionally, the processor 190 may include one or more processing units. Preferably, the processor 190 may integrate an application processor (AP) and a modem processor. The application processor mainly processes an operating system, a user interface, an application program, and the like. The modem processor mainly processes wireless communication. Main steps of a power management method provided in the embodiment of the present invention may be performed by the processor 190, and specifically, may be performed by the application processor integrated into the processor 190. It may be understood that the modem processor may not be integrated into the processor 190. In some embodiments, the processor 190 and the memory 120 may be implemented in a same chip, or in some embodiments, the processor 190 and the memory 120 may be separately implemented in independent chips.

The power supply management unit 194 can provide power information of the terminal device 100. The processor 190 may obtain, by using an operating system installed on the terminal device 100, the power information provided by the power supply management unit 194, so as to learn about current remaining power of the terminal device 100. The power supply management unit 194 may be implemented by using a power management integrated circuit (Power Management Integrated Circuit, PMIC). Certainly, an implementation form of the power supply management unit 194 is not limited in this embodiment of the present invention.

The memory 120 may be configured to store an instruction and data, and the memory 120 may mainly include an instruction storage area and a data storage area. The instruction stored in the memory 120 may enable the processor 190 to perform a power management method that is provided in an embodiment of the present invention and that is described below.

The input unit 130 may be configured to receive an input digit or input character information, and generate key signal input related to user setting and function control of the terminal device. For example, the terminal device supports touch input, so that the input unit 130 may include a touchscreen 131, and may further include another input device 132. The touchscreen 131 may collect a touch operation performed by a user on or near the touchscreen 131 (such as an operation performed by the user on the touchscreen 131 or near the touchscreen 131 by using any proper object such as a finger, a joint, or a stylus), and drive a corresponding connected apparatus based on a preset program. The touchscreen 131 may detect a touch operation performed by the user on the touchscreen 131, convert the touch operation into a touch signal, and send the touch signal to the processor 190; or it may be understood that the touchscreen 131 may send touch information of the touch operation to the processor 190, and receive and execute a command sent by the processor 190. The touchscreen 131 may provide an input interface and an output interface between the terminal device 100 and the user. In addition, the touchscreen 131 may be implemented by using multiple types such as a resistive type, a capacitive type, an infrared ray, and a surface acoustic wave. In addition to the touchscreen 131, the input unit 130 may include the another input device. For example, the another input device 132 may include but is not limited to one or more of a physical keyboard, a function key (such as a volume control key 132 or an on/off key 133), a trackball, a mouse, a joystick, and the like.

The display unit 140 may be configured to display information entered by the user or information provided for the user, and various menus of the terminal device 100. Further, the touchscreen 131 may cover the display unit 140, and after detecting a touch operation on or near the touchscreen 131, transmits the touch operation to the processor 190 to determine a type of a touch event. Then, the processor 190 provides corresponding visual output on the display unit 140 based on the type of the touch event. In this embodiment, the touchscreen 131 and the display unit 140 may be integrated into one component, so as to implement input, output, and display functions of the terminal device 100. For ease of description, that the touchscreen 131 represents a function set of the touchscreen 131 and the display unit 140 is used as an example in this embodiment of the present invention. Certainly, in some embodiments, the touchscreen 131 and the display unit 140 may also be used as two independent components.

The radio frequency unit 110 may be configured to receive and send a signal in an information receiving and sending process or in a call process. Generally, the radio frequency circuit includes but is not limited to an antenna, at least one amplifier, a transceiver, a coupler, a low noise amplifier (Low Noise Amplifier, LNA), a duplexer, or the like. In addition, the radio frequency unit 110 may further communicate with a network device and another device through wireless communication. Any communications standard or protocol may be used for the wireless communication, and includes but is not limited to Global System for Mobile Communications (Global System for Mobile Communications, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, an SMS message service (Short Message Service, SMS), or the like.

The audio frequency circuit 160, the loudspeaker 161, and the microphone 162 may provide an audio interface between the user and the terminal device 100. The audio frequency circuit 160 may transmit an electrical signal to the loudspeaker 161, where the electrical signal is obtained after received audio data is converted, and the loudspeaker 161 converts the electrical signal into a sound signal for outputting. In addition, the microphone 162 converts a collected sound signal into an electrical signal. After receiving the electrical signal, the audio frequency circuit 160 converts the electrical signal into audio data, and then outputs the audio data to the processor 190. After processing the audio data, the processor 190 sends the audio data to, for example, another terminal by using the radio frequency unit 110, or outputs the audio data to the memory 120 for further processing. The audio frequency circuit may further include an earphone jack 163 configured to provide a connection interface between the audio frequency circuit and an earphone.

Wi-Fi is a short-distance wireless transmission technology. The terminal device 100 may help, by using the Wi-Fi module 170, the user to receive and send an email, browse a web page, access streaming media, and the like. The Wi-Fi module 170 provides wireless broadband Internet access for the user. Although the Wi-Fi module 170 is shown in FIG. 1A, it may be understood that the Wi-Fi module 170 is not a mandatory component of the terminal device 100, and may be omitted based on a requirement without changing the essence of the present invention.

Bluetooth (Bluetooth) is a short-distance wireless communications technology. Communication between mobile communications terminal devices such as a palm computer, a notebook computer, and a mobile phone can be effectively simplified by using the Bluetooth technology, and communication between the foregoing devices and the Internet (Internet) can also be successfully simplified. Data transmission between the terminal device 100 and the Internet becomes more fast and efficient by using the Bluetooth module 180, so as to pave the way for wireless communication. The Bluetooth technology is an open solution that can implement voice and data wireless transmission. Although FIG. 1A shows the Bluetooth module 180, it may be understood that the Bluetooth module 180 is not a mandatory component of the terminal device 100, and may be omitted based on a requirement without changing the essence of the present invention.

The terminal device 100 may further include the power supply 193, such as a battery, that supplies power to each component. Preferably, the power supply may be logically connected to the processor 190 by using a power supply management system, so as to implement functions such as charging and discharging management, and power consumption management by using the power supply management system.

The terminal device 100 may further include the external interface 197. The external interface may include a standard micro universal serial bus (Micro Universal Serial Bus, Micro USB) interface or a multi-pin connector, and may be configured to connect the terminal device 100 and another device for communication, or may be configured to connect a charger to charge the terminal device 100.

The terminal device 100 may further include another possible function module such as a camera lens, a camera flash, or various sensors, although not shown. Details are not described herein.

Figure 1B:
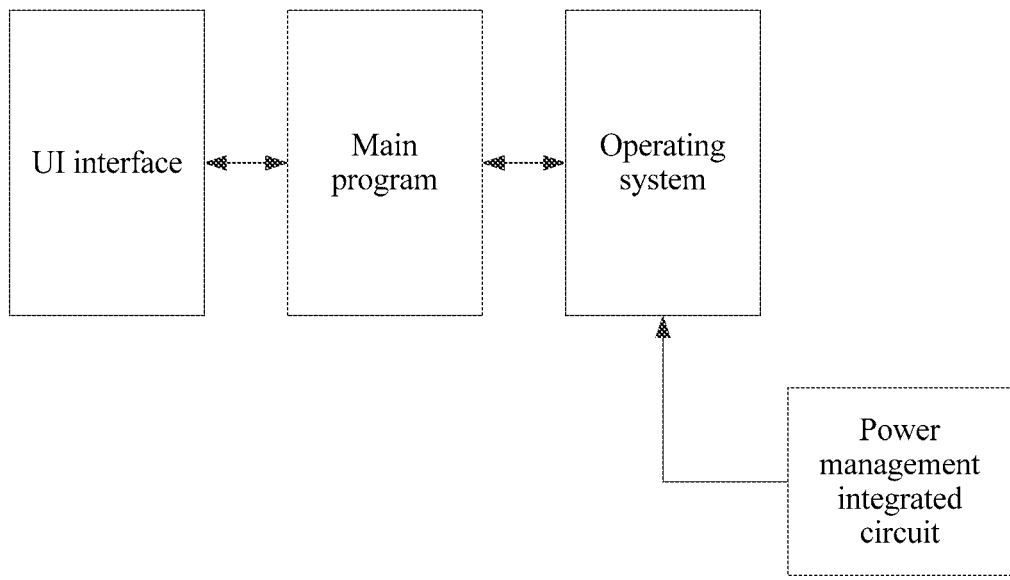
FIG. 1B is a schematic diagram of a software architecture of a terminal device according to an embodiment of the present invention.

Referring to FIG. 1B, FIG. 1B is a software architecture of a terminal device 100 according to an embodiment of the present invention. FIG. 1B includes a user interface (User Interface, UI), a main program, and an operating system that are provided by the terminal device 100. The UI interface may be presented to a user by using the display unit 140 provided in the embodiment shown in FIG. 1, so that the user can perform an operation. The main program may be implemented by using the processor 190 provided in the embodiment shown in FIG. 1. In addition, FIG. 1B further includes a PMIC, and the processor 190 may obtain a reading of the PMIC by using the operating system, that is, obtain current remaining power of the terminal device 100.

The terminal device 100 shown in FIG. 1A or FIG. 1B may be configured to perform a method provided in an embodiment of the present invention. The following describes the method that can be performed by the terminal device 100 shown in FIG. 1A or FIG. 1B.

Figure 2:
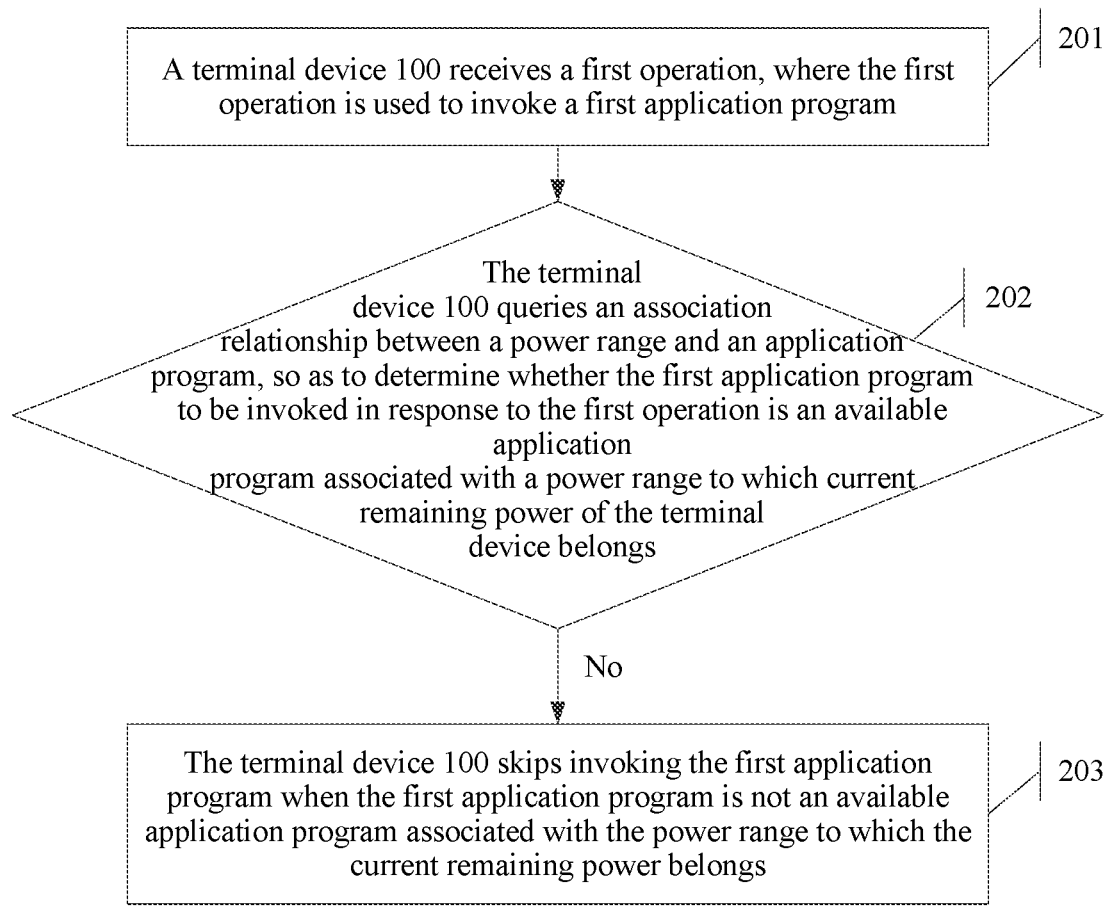
FIG. 2 is a flowchart of a power management method according to an embodiment of the present invention.

Referring to FIG. 2, an embodiment of the present invention provides a power management method. The method may be performed by the terminal device 100 in the embodiment shown in FIG. 1A or FIG. 1B.

Step 201: The terminal device 100 receives a first operation, where the first operation is used to invoke a first application program.

Step 202: The terminal device 100 queries an association relationship between a power range and an application program, so as to determine whether the first application program to be invoked in response to the first operation is an available application program associated with a power range to which current remaining power of the terminal device belongs.

Step 203: The terminal device 100 skips invoking the first application program when the first application program is not an available application program associated with the power range to which the current remaining power belongs.

An example in which the processor 190 in the terminal device 100 is specifically used to execute the embodiment shown in FIG. 2 is used for description below.

In this embodiment of the present invention, an application program may also be referred to as an application (application, APP).

Figure 3:
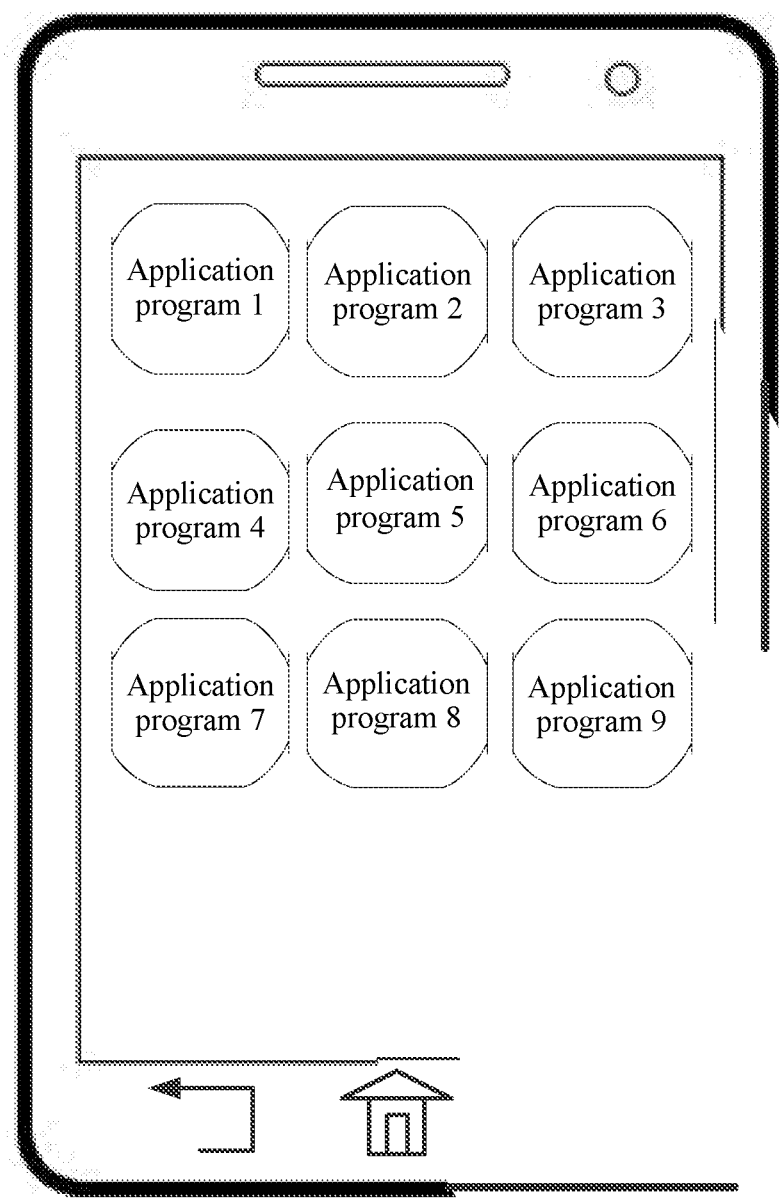
FIG. 3 is a schematic diagram of performing a first operation by a user according to an embodiment of the present invention.

The first operation may be an operation performed by a user on the terminal device 100, for example, a touch operation performed by the user on the touchscreen 131. Alternatively, the first operation may be an operation performed by the terminal device 100 itself. For example, a malicious application program is installed on the terminal device 100. The malicious application program may actively invoke the malicious application program by using the first operation when no operation is performed by the user, or the malicious application program may actively invoke another application program by using the first operation when no operation is performed by the user. Consequently, the application program runs on a background of the terminal device 100 without permission and consumes power. The first operation is mainly an operation performed by the user on the terminal device 100 in description below. Referring to FIG. 3, the user performs an operation on the display unit 140 of the terminal device 100. The display unit 140 displays some application icons, and each application icon is corresponding to one application program. The user taps an application icon 5, that is, the user performs a first operation.

After receiving the first operation, the terminal device 100 determines that an application program, for example, a first application program, corresponding to the application icon 5 needs to be invoked.

The first operation needs to invoke the first application program. In this case, the processor 190 obtains, by using the operating system, current remaining power of the terminal device 100 that is provided by the power supply management unit 194. In addition, the processor 190 queries the association relationship between a power range and an application program, determines a power range to which the current remaining power of the terminal device 100 belongs, and determines whether the first application program is an available application program associated with the power range to which the current remaining power belongs. If the first application program is an available application program associated with the power range to which the current remaining power belongs, the processor 190 may invoke the first application program by responding to the first operation. However, the processor 190 skips invoking the first application program if the first application program is not an available application program associated with the power range to which the current remaining power belongs. Therefore, a possibility of running a power-intensive application program can be fundamentally eliminated. Application programs may be managed based on a specified association relationship when power is relatively sufficient, so as to effectively arrange running of the application programs, and prolong a battery life of the terminal device in a whole process.

The association relationship between a power range and an application program is mentioned above, and the following describes how to obtain the association relationship.

The processor 190 of the terminal device 100 may divide power of the terminal device 100 into at least one power range. A minimum power value included in the at least one power range is minimum power that can be supported by the terminal device 100, and a maximum power value included in the at least one power range is maximum power that can be supported by the terminal device 100. The minimum power that can be supported by the terminal device 100 herein may be actual minimum power of the terminal device 100, for example, 0%; or may be alarm power of the terminal device 100. The alarm power varies with the terminal device 100, and is usually 20%, or may be 15%, 10%, or the like. If remaining power of the terminal device 100 is less than the alarm power, the terminal device 100 usually sends out an alarm. In addition, the terminal device 100 may be unstable when working in a state in which power is less than the alarm power, and abnormal shutdown may occur at any time. A value of the minimum power that can be supported by the terminal device is not limited in this embodiment of the present invention. After the at least one power range is obtained through division, at least one application program is associated with each of the at least one power range, so as to constitute the association relationship between a power range and an application program. The association relationship may be set by the terminal device 100 itself, for example, may be set when the terminal device 100 is delivered from a factory. Alternatively, the association relationship may be set by a user using the terminal device 100.

Figure 4:
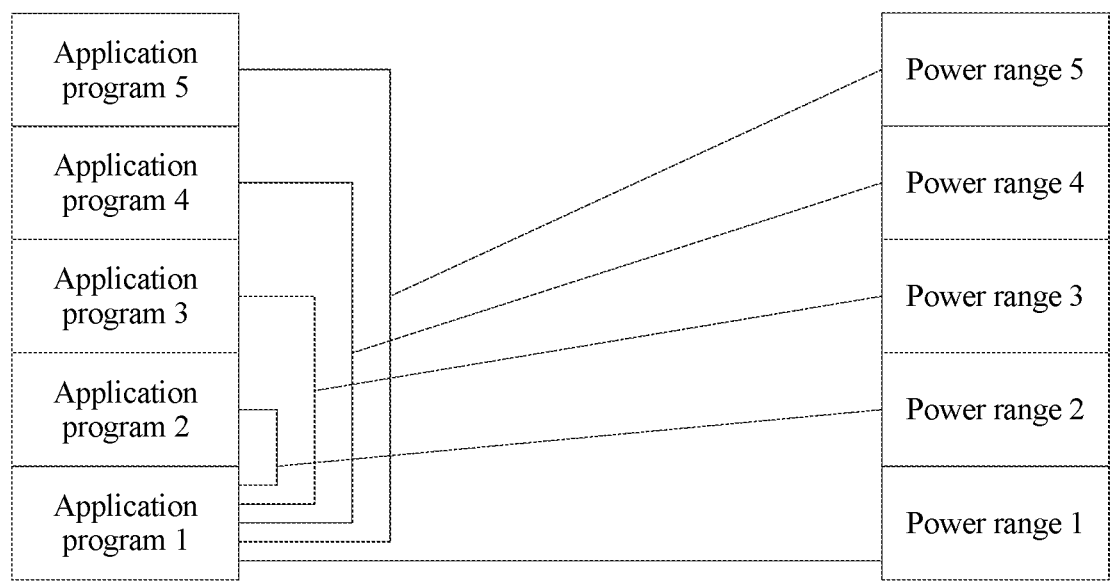
FIG. 4 is a schematic diagram of an association relationship between an application program and a power range according to an embodiment of the present invention.

Referring to FIG. 4, FIG. 4 is an example of an association relationship. For example, in FIG. 4, application programs associated with power ranges include an application program 1, an application program 2, an application program 3, an application program 4, and an application program 5 that are installed on the terminal device 100. The application program 1, the application program 2, the application program 3, the application program 4, and the application program 5 may be all or some application programs installed on the terminal device 100. The terminal device 100 divides the power of the terminal device 100 into five power ranges based on five power thresholds. The five power thresholds are respectively N1, N2, N3, N4, and N5. A power range 1 is [0%, N1], a power range 2 is [N1, N2], a power range 3 is [N3, N4], a power range 4 is [N4, N5], and a power range 5 is [N5, 100%]. That is, in FIG. 4, that the minimum power that can be supported by the terminal device 100 is the actual minimum power 0% of the terminal device 100 is used as an example. It may be seen from FIG. 4 that the application program 1 is associated with the power range 1; the application program 1 and the application program 2 are associated with the power range 2; the application program 1, the application program 2, and the application program 3 are associated with the power range 3; the application program 1, the application program 2, the application program 3, and the application program 4 are associated with the power range 4; and the application program 1, the application program 2, the application program 3, the application program 4, and the application program 5 are associated with the power range 5. For example, when the current remaining power of the terminal device 100 is within the range [0%, N1], only the application program 1 can be invoked, and the application program 2 cannot be directly invoked.

FIG. 4 shows an example in which a power range is directly associated with an application program. In actual application, a power range may also be associated with an application program type. Referring to Table 1, Table 1 shows an example of another association relationship.

TABLE 1

| Power Range | Application Program |
|---|---|
| [90%, 100%] | Game application program, information pushing application program, communication application program, audio application program, and video application program |
| [70%, 90%) | Information pushing application program, communication application program, audio application program, and video application program |
| [50%, 70%) | Information pushing application program and communication application program |
| [30%, 50%) | Communication application program |
| [15%, 30%) | Communication application program |

In Table 1, the terminal device 100 divides the power of the terminal device 100 into five power ranges. A minimum power value included in the five power ranges is a minimum safety power of the terminal device 100, for example, 15%. A maximum power value included in the five power ranges is maximum power supported by the terminal device 100, that is, 100%. The terminal device 100 may first classify application programs installed on the terminal device 100 into different types. In Table 1, the application programs installed on the terminal device 100 are classified into five types: a game application program, an information pushing application program, a communication application program, an audio application program, and a video application program. Certainly, the application programs installed on the terminal device 100 may be classified into more or fewer types in actual application. This is not limited in this embodiment of the present invention. After the application programs installed on the terminal device 100 are classified into different types, power ranges are associated with the types of the application programs, for example, [30%, 50%) is associated with the communication application program. The application programs associated with the power ranges may be all the application programs installed on the terminal device 100, that is, each application program installed on the terminal device 100 is associated with a power range; or the application programs associated with the power ranges are only some application programs installed on the terminal device 100. For example, the user sets some application programs to be associated with the power ranges, and the user may normally use other application programs in any case. Therefore, if each application program installed on the terminal device 100 is associated with a power range, for example, power of the terminal device 100 is within the range [30%, 50%), each communication application program installed on the terminal device 100 is an available application program associated with the power range to which the current remaining power of the terminal device 100 belongs, for example, a call application program and an SMS message application program. However, if the application programs associated with the power ranges are only some application programs installed on the terminal device 100, for example, power of the terminal device 100 is within the range [30%, 50%), all or some communication application programs installed on the terminal device 100 are available application programs associated with the power range to which the current remaining power of the terminal device 100 belongs.

In addition, because usually the communication application program such as a call application program is relatively important, the communication application program may still be supported even if there is less remaining power, so as to prevent the user from missing an important incoming call or being incapable of making a call.

Processing performed by the terminal device 100 on the first operation is further described below. In this specification, the processor 190 skips invoking the first application program in several manners.

Manner 1: The processor 190 directly skips invoking the first application program, and user experience is that although the user performs an operation for invoking the first application program, the terminal device 100 makes no response.

Manner 2: The processor 190 first outputs prompt information to remind the user, and the user determines whether to continue to invoke the first application program. For example, the prompt information is text information, and the text information is "Current remaining power may be insufficient to meet a requirement of the first application program, continue to invoke?". After seeing the prompt information, the user may perform an operation on the terminal device 100 to make a decision, and the terminal device 100 determines, based on the decision of the user, how to operate. If the user determines to give up invoking, the terminal device 100 performs no further processing, that is, skips invoking the first application program. If the user determines to continue to invoke the first application program, the processor 190 continues to respond to the operation of the user to invoke the first application program. After all, it is user experience that matters.

A manner in which the processor 190 performs processing may be preset by the terminal device 100 or selected by the user in advance.

Figure 5:
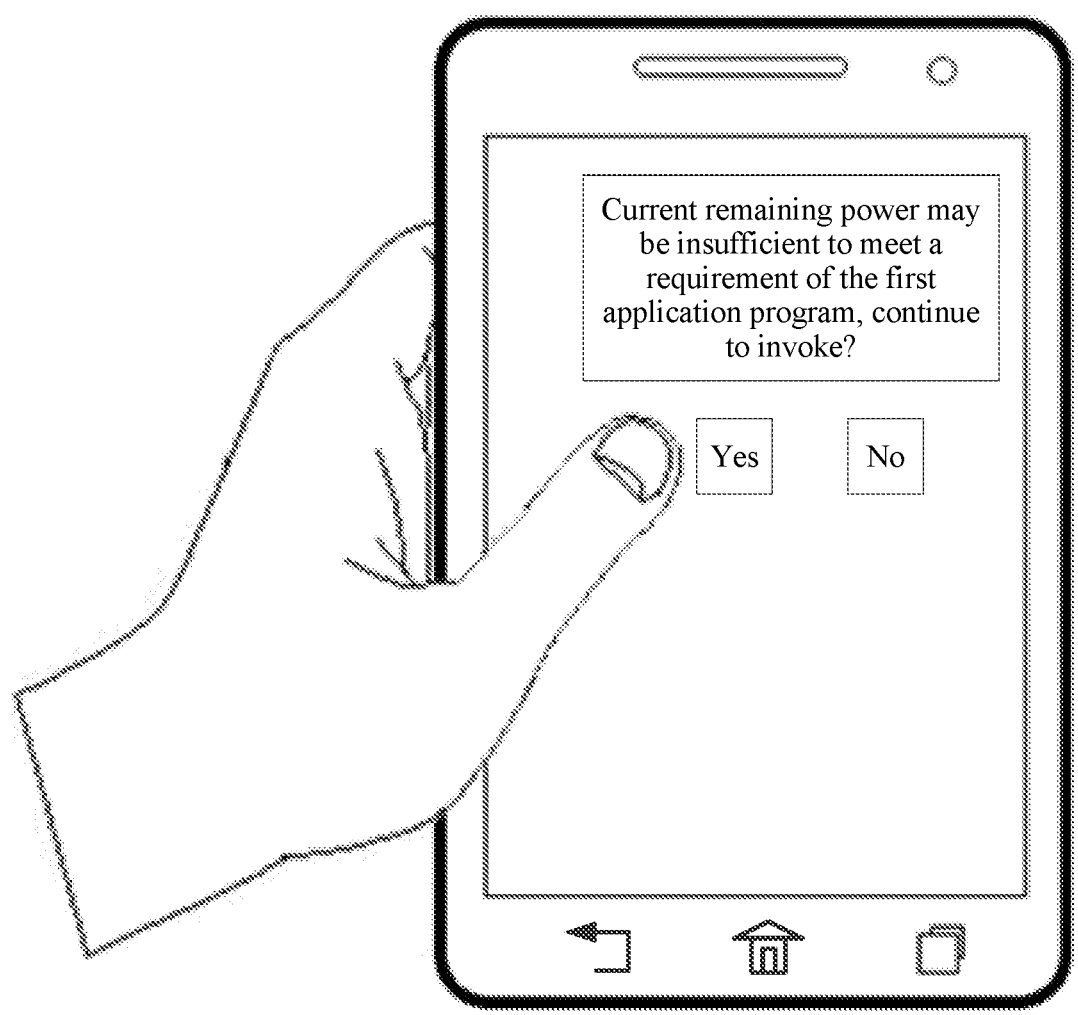
FIG. 5 is a schematic diagram of first prompt information according to an embodiment of the present invention.

In a possible implementation, it may be unfriendly to the user if a processing manner is as follows: The first operation is performed by the user, the first application program to be invoked based on a request of the first operation is not an available application program associated with the power range to which the current remaining power of the terminal device 100 belongs, and the terminal device 100 directly skips invoking the first application program in Manner 1. To provide better user experience, after receiving the first operation, the processor 190 may distinguish whether the first operation is performed by the user or actively performed by an application program installed on the terminal device 100. The processor 190 may directly skip invoking the first application program in Manner 1 if the first operation is not performed by the user and the first application program to be invoked based on the request of the first operation is not an available application program associated with the power range to which the current remaining power of the terminal device 100 belongs. Alternatively, the processor 190 may perform processing in Manner 2 if the first operation is performed by the user and the first application program to be invoked based on the request of the first operation is not an available application program associated with the power range to which the current remaining power of the terminal device 100 belongs. That is, the processor 190 does not directly refuse to invoke the first application program, but outputs prompt information. The prompt information is referred to as first prompt information, and the first prompt information is used to provide a prompt about whether to give up invoking the first application program. For example, the processor 190 may output the first prompt information by using the display unit 140, or output the first prompt information by using the loudspeaker 161. In any case, the user can receive the first prompt information. For example, referring to FIG. 5, the processor 190 outputs the first prompt information by using the display unit 140, content of the first prompt information is "Current remaining power may be insufficient to meet a requirement of the first application program, continue to invoke?", and the first prompt information further includes two options: "Yes" and "No". After receiving the first prompt information, the user may make a selection based on the first prompt information, and feed back a selection result to the terminal device 100. For example, the user performs an operation on the touchscreen 131 to feed back the selection result to the terminal device 100. The selection result fed back by the user includes two types: If the user selects "No", the user determines to give up invoking the first application program; or if the user selects "Yes", the user determines to continue to invoke the first application program. Then, the processor 190 receives the selection result fed back by the user, and performs an operation based on the selection result fed back by the user. The processor 190 skips invoking the first application program when the selection result fed back by the user indicates that the user gives up invoking the first application program. Alternatively, the processor 190 continues to invoke the first application program when the selection result fed back by the user indicates that the user continues to invoke the first application program. In this way, a user requirement can be better met, and user experience can be improved. In addition, the first prompt information is output, so that the user learns that current power is not suitable for running the first application program. Even if the user determines to continue to invoke the first application program, power saving may be considered as much as possible during running of the first application program, or the user may determine to charge the terminal device 100 to prolong a battery life of the terminal device 100.

Figure 6:
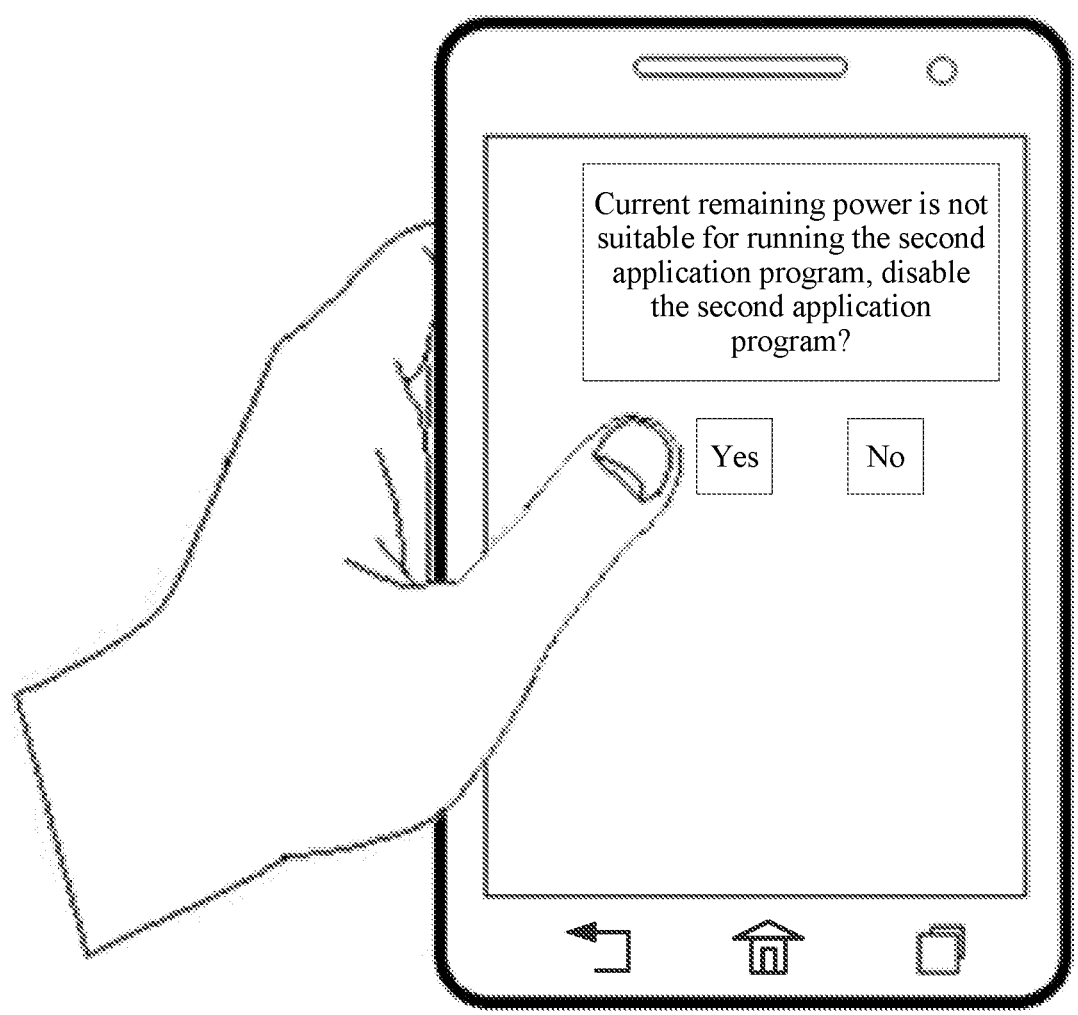
FIG. 6 is a schematic diagram of second prompt information according to an embodiment of the present invention.

In addition, the power ranges are obtained through division, and different power ranges may be associated with different application programs. Therefore, if remaining power of the terminal device 100 enters a current power range from a previous range, application programs running on the terminal device 100 may include application programs associated with the previous power range, and the application programs may not be associated with the power range to which current remaining power belongs, it may be not conducive to power saving if the application programs continue to run. For example, the remaining power of the terminal device 100 enters a second power range included in the association relationship from a first power range included in the association relationship. Then, the processor 190 may determine whether application programs currently running on the terminal device 100 include an application program that is not associated with the second power range. If the processor 190 determines that a second application program in the application programs currently running on the terminal device 100 is not an available application program associated with the second power range, the processor 190 may directly disable the second application program to achieve an objective of power saving as soon as possible. Alternatively, to provide friendlier user experience, the processor 190 may not directly disable the second application program, but determines to output prompt information. The prompt information is referred to as second prompt information below. The second prompt information is used to provide a prompt about whether to disable the second application program. For example, the processor 190 may output the second prompt information by using the display unit 140, or output the second prompt information by using the loudspeaker 161. In any case, the user can receive the second prompt information. For example, referring to FIG. 6, the processor 190 outputs the second prompt information by using the display unit 140, content of the first prompt information is "Current remaining power is not suitable for running the second application program, disable the second application program?", and the second prompt information further includes two options: "Yes" and "No". After receiving the second prompt information, the user may make a selection based on the second prompt information, and feed back a selection result to the terminal device 100. For example, the user feeds back the selection result to the terminal device 100 by performing an operation on the touchscreen 131. The selection result fed back by the user includes two types: If the user selects "Yes", the user determines to disable the second application program; or if the user selects "No", the user determines to continue to run the second application program. Then, the processor 190 receives the selection result fed back by the user, and performs an operation based on the selection result fed back by the user. When the selection result fed back by the user indicates that the second application program is to be disabled, the processor 190 disables the currently running second application program; or when the selection result fed back by the user indicates that running of the second application program is to be continued, the processor 190 performs no operation, and normal running of the second application program continues. In this way, a user requirement can be better met, and user experience can be improved. In addition, the second prompt information is output, so that the user learns that current power is not suitable for running the second application program. Even if the user determines to continue to run the second application program, power saving may be considered as much as possible during running of the second application program, or the user may determine to charge the terminal device 100 to prolong a battery life of the terminal device 100.

Figure 7:
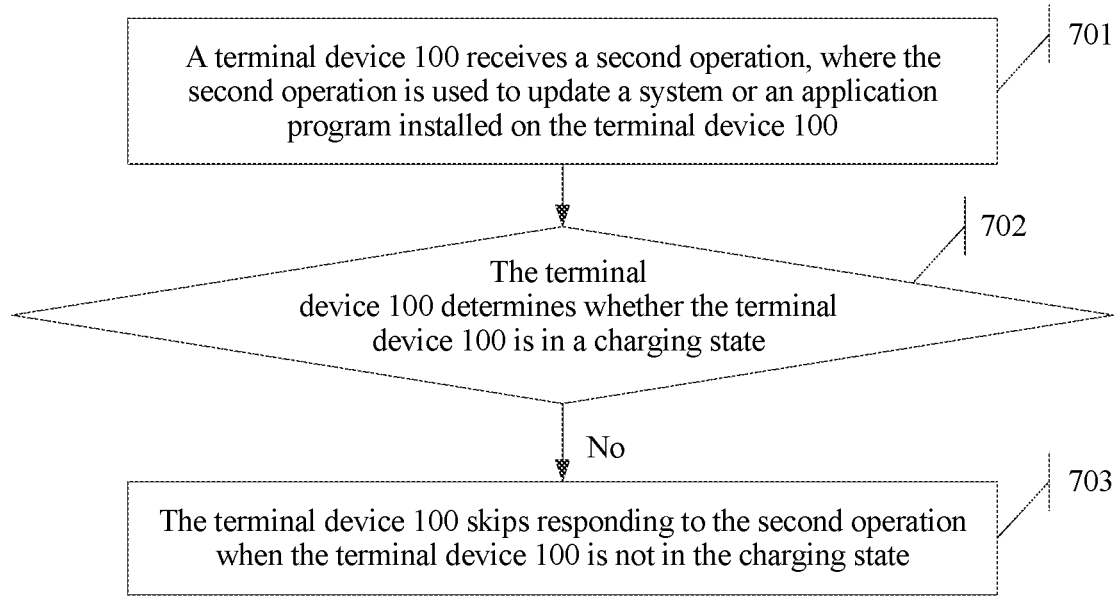
FIG. 7 is a flowchart of a power management method according to an embodiment of the present invention.

Referring to FIG. 7, an embodiment of the present invention provides a power management method. The method may be performed by the terminal device 100 in the embodiment shown in FIG. 1A or FIG. 1B.

Step 701: The terminal device 100 receives a second operation, where the second operation is used to update a system or an application program installed on the terminal device 100.

Step 702: The terminal device 100 determines whether the terminal device 100 is in a charging state.

Step 703: The terminal device 100 skips responding to the second operation when the terminal device 100 is not in the charging state.

Some operations, such as an operation for updating a system installed on the terminal device 100, that is, a system update operation, an operation for updating an application program installed on the terminal device 100, that is, an application update operation, or an operation for updating firmware on the terminal device 100, that is, a firmware update operation, have some common features, for example, the update operations are power-intensive. Before responding to the update operations, the processor 190 may obtain power required for responding to the update operations. Certainly, the obtained power required for responding to the operation herein may not be extremely accurate, provided that the power required for responding to the operation can be roughly estimated. For example, for some update operations, including an operation for updating an application program, an operation for updating a system, an operation for updating firmware, or the like, generally, the processor 190 can roughly learn about in advance power required for responding to the update operations.

After the terminal device 100 receives the second operation, the processor 190 may determine whether the terminal device 100 is in the charging state. If the terminal device 100 is not in the charging state, the processor 190 may determine to directly skip responding to the second operation. In addition, if the terminal device 100 is in the charging state, the processor 190 may respond to the second operation. Generally, the second operation may consume relatively much power. Therefore, the second operation needs to be performed in the charging state as far as possible, so as to avoid affecting normal use of the terminal device 100 because excessive power is consumed when the second operation is responded to.

Alternatively, the processor 190 may obtain the power required for responding to the second operation. Therefore, if the terminal device 100 is not in the charging state, the processor 190 may determine whether a difference between remaining power of the terminal device 100 and the power required for responding to the second operation is less than a preset threshold, that is, determine whether remaining power of the terminal device 100 after responding to the second operation is completed is still greater than or equal to the preset threshold. The terminal device 100 skips responding to the second operation if the difference between the remaining power of the terminal device 100 and the power required for performing the second operation is less than the preset threshold. The terminal device 100 may respond to the second operation if the difference between the remaining power of the terminal device 100 and the power required for performing the second operation is greater than or equal to the preset threshold.

The preset threshold herein is a safe power value of the terminal device 100, and may be actual minimum power supported by the terminal device 100, for example, 0%, or may be alarm power of the terminal device 100, for example, 20% or 15%. If the preset threshold is the actual minimum power supported by the terminal device 100, the terminal device 100 not in the charging state may respond to slightly more second operations. Even if the remaining power of the terminal device 100 is less than the alarm power, the terminal device 100 may still work. Therefore, the preset threshold may be set to the actual minimum power supported by the terminal device 100, so as to respond to as many as possible second operations. In addition, the difference between the remaining power of the terminal device 100 and the power required for responding to the second operation cannot be less than the actual minimum power supported by the terminal device 100. This is to prevent a system, an application program, or the like on the terminal device 100 from becoming disordered because the terminal device 100 is shut down when the responding to the second operation is not completed. If the preset threshold is the alarm power of the terminal device 100, it may be ensured that responding to the second operation does not affect normal use of the terminal device 100.

According to the technical solution provided in this embodiment of the present invention, an application program is "stopped" or a prompt is provided based on a customized rule before the application program starts to consume much power, so as to better reduce power consumption. A pre-event constraining manner is used together with "customization" and participation of the user, so that a power saving effect is implemented, and user experience is also ensured as much as possible.

A device provided in the embodiments of the present invention is further described below with reference to the accompanying drawings.

Figure 8:
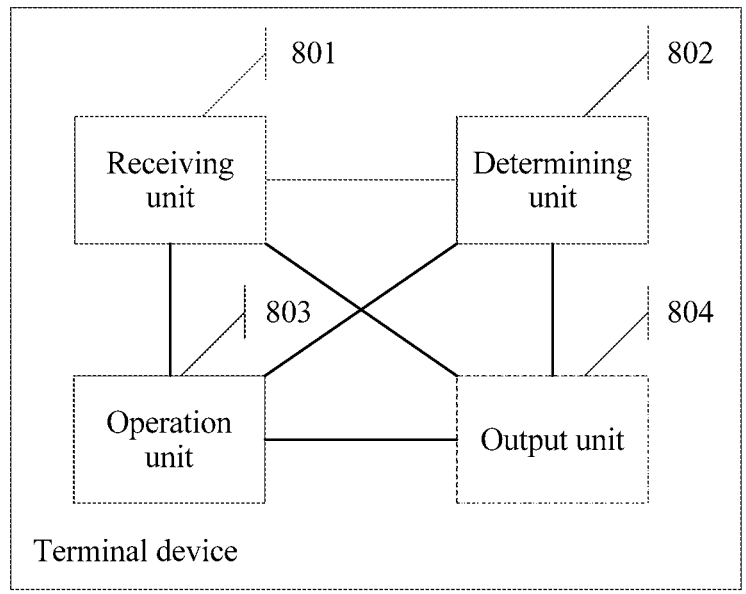
FIG. 8 is a schematic structural diagram of a terminal device according to an embodiment of the present invention.

Referring to FIG. 8, an embodiment of the present invention provides a terminal device. The terminal device may include a receiving unit 801, a determining unit 802, and an operation unit 803. The terminal device may be the terminal device 100 in the embodiment shown in FIG. 1A or FIG. 1B.

The receiving unit 801 is configured to receive a first operation, where the first operation is used to invoke a first application program. The determining unit 802 is configured to query an association relationship between a power range and an application program, so as to determine whether the first application program to be invoked in response to the first operation is an available application program associated with a power range to which current remaining power of the terminal device belongs. The operation unit 803 is configured to skip invoking the first application program when the first application program is not an available application program associated with the power range to which the current remaining power belongs.

In a possible implementation, the terminal device further includes an output unit 804, which is also drawn in FIG. 8. The output unit 804 is an optional function unit, and is drawn by using a dashed line in FIG. 8 so as to be differentiated from a mandatory function unit.

The output unit 804 is configured to output first prompt information before the operation unit 803 skips invoking the first application program. The first prompt information is used to provide a prompt about whether to give up invoking the first application program. The receiving unit 801 is further configured to receive an input operation for the first prompt information. That the operation unit 803 is configured to skip invoking the first application program includes:

refusing to invoke the first application program when the input operation is used to instruct to give up invoking the first application program.

In a possible implementation, the operation unit 803 is further configured to: divide power of the terminal device into at least one power range, where a minimum power value included in the at least one power range is minimum power that can be supported by the terminal device, and a maximum power value included in the at least one power range is maximum power that can be supported by the terminal device; and associate at least one application program with each of the at least one power range, so as to constitute the association relationship.

In a possible implementation, the operation unit 803 is further configured to invoke the first application program when the first application program is an available application program associated with the power range to which the current remaining power belongs.

In a possible implementation, the operation unit 803 is further configured to determine that remaining power of the terminal device enters a second power range included in the association relationship from a first power range included in the association relationship. The output unit 804 is further configured to output second prompt information when a second application program running on the terminal device is not an available application program associated with the second power range. The second prompt information is used to provide a prompt about whether to disable the second application program.

In actual application, an entity device corresponding to the receiving unit 801 may be the input unit 130 in FIG. 1A. An entity device corresponding to the determining unit 802 and the operation unit 803 may be the processor 190 in FIG. 1A. An entity device corresponding to the output unit 804 may be the display unit 140 in FIG. 1A, the loudspeaker 161 in FIG. 1A, or the like.

The terminal device may be configured to perform the method provided in the embodiment shown in FIG. 2, and may be, for example, the terminal device 100 described above. Therefore, for functions and the like implemented by function units in the terminal device, refer to description in the embodiment shown in FIG. 1A, description in the embodiment shown in FIG. 1B, or description in the embodiment shown in FIG. 2, and details are not described again.

Figure 9:
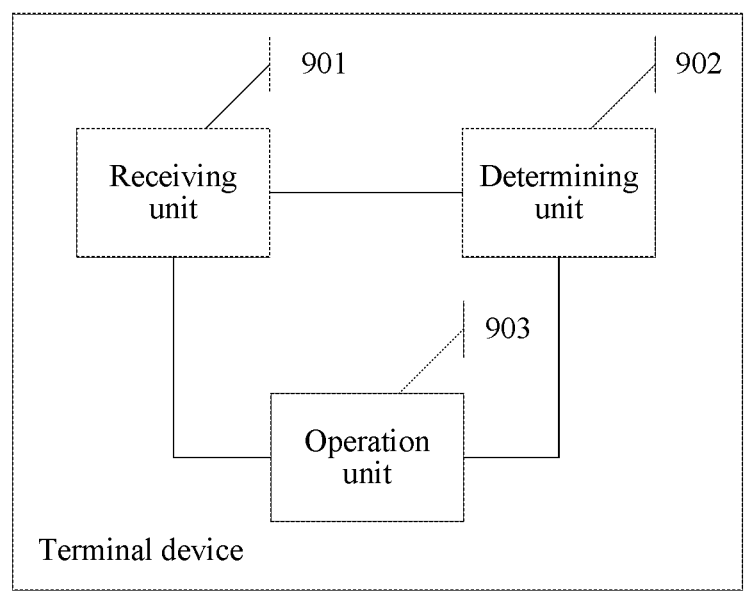
FIG. 9 is a schematic structural diagram of a terminal device according to an embodiment of the present invention.

Referring to FIG. 9, an embodiment of the present invention provides a terminal device. The terminal device may include a receiving unit 901, a determining unit 902, and an operation unit 903. The terminal device may be the terminal device 100 in the embodiment shown in FIG. 1A or FIG. 1B.

The receiving unit 901 is configured to receive a second operation. The second operation is used to update a system or an application program installed on the terminal device. The determining unit 902 is configured to determine whether the terminal device is in a charging state. The operation unit 903 is configured to skip responding to the second operation when the terminal device is not in the charging state.

In a possible implementation, the determining unit 902 is further configured to: before the operation unit 903 skips responding to the second operation, determine whether a difference between remaining power of the terminal device and power required for responding to the second operation is less than a preset threshold. The preset threshold is a safe power value of the terminal device. That the operation unit 903 is configured to skip responding to the second operation includes: skipping responding to the second operation when the difference between the remaining power of the terminal device and the power required for performing the second operation is less than the preset threshold.

In a possible implementation, the operation unit 903 is further configured to respond to the second operation when the difference between the remaining power of the terminal device and the power required for performing the second operation is greater than or equal to the preset threshold.

In a possible implementation, the operation unit 903 is further configured to respond to the second operation when the terminal device is in the charging state.

In actual application, an entity device corresponding to the receiving unit 901 may be the input unit 130 in FIG. 1A. An entity device corresponding to the determining unit 902 and the operation unit 903 may be the processor 190 in FIG. 1A.

The terminal device may be configured to perform the method provided in the embodiment shown in FIG. 7, and may be, for example, the terminal device 100 described above. Therefore, for functions and the like implemented by function units in the terminal device, refer to description in the embodiment shown in FIG. 1A, description in the embodiment shown in FIG. 1B, or description in the embodiment shown in FIG. 7, and details are not described again.

In the embodiments of the present invention, the association relationship between a power range and an application program may be preset. After receiving the first operation, the terminal device determines whether the first application program to be invoked by the first operation is an available application program associated with the power range to which the current remaining power belongs. The terminal device refuses to invoke the first application program if the first application program to be invoked by the first operation is not an available application program associated with the power range to which the current remaining power belongs. That is, a possibility of running a power-intensive application program can be fundamentally eliminated. Application programs may be managed based on a specified association relationship when power is relatively sufficient, so as to effectively arrange running of the application programs, and prolong a battery life of the terminal device in a whole process.

In the embodiments of the present invention, it should be understood that the disclosed device and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The embodiments of the present invention further provide a computer storage medium. The computer storage medium may store a program, and when the program is executed, a part or all of the steps of any method in the foregoing method embodiments may be performed.

Function units in the embodiments of the present invention may be integrated into one processing unit, or each of the units may exist alone physically.

When the integrated unit is implemented in the form of a software function unit and sold or used as an independent product, the integrated unit may be stored in a computerreadable storage medium. Based on such an understanding, all or a part of technical solutions of the embodiments of the present invention may be implemented in a form of a software product. The computer software product is stored in a storage medium and includes several instructions for instructing a computer device, which may be a personal computer, a server, or a network device, or a processor (processor) to perform all or a part of the steps of the methods described in the embodiments of the present invention. The foregoing storage medium includes: any medium that can store program code, such as a USB flash drive (Universal Serial Bus flash drive), a removable hard disk, a ROM, a RAM, a magnetic disk, or an optical disc.

The foregoing described embodiments are merely used to describe in detail the technical solutions of the embodiments of the present invention. The foregoing embodiments are merely intended to help understand the method of the embodiments of the present invention, and shall not be construed as a limitation on the embodiments of the present invention. Any variation or replacement readily figured out by a person skilled in the art shall fall within the protection scope of the embodiments of the present invention.

What is claimed is:

1. A power management method, comprising:
   receiving, by a terminal device, a first operation, wherein the first operation is used to invoke a first application program;
   querying, by the terminal device, an association relationship between a power range and the first application program, so as to determine whether the first application program to be invoked in response to the first operation is an available application program associated with the power range, wherein the power range includes a minimum power value and a maximum power value, the minimum power value reflecting a first percentage relation with a full power of the terminal device and the maximum power value reflecting a second percentage relation with the full power of the terminal device;
   determining the first application program is not an available application program by virtue of the first application program is not associated with the power range;
   skipping invoking, by the terminal device, the first application program in response to the determination that the first application program is not an available application program;
   dividing, by the terminal device, power of the terminal device into at least one power range, wherein a minimum power value of the at least one power range is minimum power that can be supported by the terminal device, and a maximum power value of the at least one power range is maximum power that can be supported by the terminal device; and
   associating, by the terminal device, at least one application program with each of the at least one power range, so as to constitute an association relationship between the at least one application program and each of the at least one power range.

2. The method according to claim 1, wherein
   before the skipping invoking, by the terminal device, the first application program, the method further comprises:
   outputting, by the terminal device, first prompt information, wherein the first prompt information is used to provide a prompt about whether to give up invoking the first application program; and
   receiving, by the terminal device, an input operation for the first prompt information; and, wherein
   skipping invoking, by the terminal device, the first application program comprises:
   skipping invoking, by the terminal device, the first application program when the input operation is used to instruct to give up invoking the first application program.

3. The method according to claim 1, further comprising:
   invoking, by the terminal device, the first application program by virtue of the first application program being determined as an available application program associated with the power range.

4. The method according to claim 1, wherein the power range is a first power range, the method further comprising:
   determining, by the terminal device, that remaining power of the terminal device enters a second power range comprised in the association relationship from a first power range comprised in the association relationship; and
   outputting, by the terminal device, second prompt information when a second application program running on the terminal device is not an available application program associated with the second power range, wherein the second prompt information is used to provide a prompt about whether to disable the second application program.

5. A power management method, comprising:
   receiving, by a terminal device, a second operation, wherein the second operation is used to update a system or an application program installed on the terminal device;
   determining, by the terminal device, whether a difference between remaining power of the terminal device and power required for responding to the second operation is less than a preset threshold, wherein the preset threshold is a safe power value of the terminal device;
   determining, by the terminal device, whether the terminal device is in a charging state; and
   skipping responding, by the terminal device, to the second operation when the difference between the remaining power of the terminal device and the power required for performing the second operation is less than the preset threshold and when the terminal device is not in the charging state;
   dividing, by the terminal device, power of the terminal device into at least one power range, wherein a minimum power value of the at least one power range is minimum power that can be supported by the terminal device, and a maximum power value of the at least one power range is maximum power that can be supported by the terminal device; and
   associating, by the terminal device, at least one application program with each of the at least one power range, so as to constitute an association relationship between the at least one application program and each of the at least one power range.

6. The method according to claim 5, further comprising:
   responding, by the terminal device, to the second operation when the difference between the remaining power of the terminal device and the power required for performing the second operation is greater than or equal to the preset threshold.

7. The method according to claim 5, further comprising:
   responding, by the terminal device, to the second operation when the terminal device is in the charging state.

8. A terminal device, comprising:
a receiving unit, configured to receive a first operation, wherein the first operation is used to invoke a first application program;
a determining unit, configured to:
   query the terminal device, an association relationship between a power range and the first application program, so as to determine whether the first application program to be invoked in response to the first operation is an available application program associated with the power range, wherein the power range includes a minimum power value and a maximum power value, the minimum power value reflecting a first percentage relation with a full power of the terminal device and the maximum power value reflecting a second percentage relation with the full power of the terminal device; and
   determining the first application program is not an available application program by virtue of the first application program is not associated with the power range;
an operation unit, configured to skip invoking the first application program in response to the determination that the first application program is not an available application program;
divide power of the terminal device into at least one power range, wherein a minimum power value of the at least one power range is minimum power that can be supported by the terminal device, and a maximum power value of the at least one power range is maximum power that can be supported by the terminal device; and
associate at least one application program with each of the at least one power range, so as to constitute an association relationship between the at least one application program and each of the at least one power range.

9. The terminal device according to claim 8, wherein the terminal device further comprises an output unit;
   the output unit is configured to output first prompt information before the operation unit skips invoking the first application program, wherein the first prompt information is used to provide a prompt about whether to give up invoking the first application program; and, wherein
   the receiving unit is further configured to receive an input operation for the first prompt information; and
   that the operation unit is configured to skip invoking the first application program comprises: refusing to invoke the first application program when the input operation is used to instruct to give up invoking the first application program.

10. The terminal device according to claim 8, wherein the operation unit is further configured to:
   invoke the first application program when the first application program is an available application program associated with the power range.

11. The terminal device according to claim 8, wherein the power range is a first power range and the terminal device further comprises an output unit;
   the operation unit is further configured to determine that remaining power of the terminal device enters a second power range comprised in the association relationship from a first power range comprised in the association relationship; and
   the output unit is configured to output second prompt information when a second application program running on the terminal device is not an available application program associated with the second power range, wherein the second prompt information is used to provide a prompt about whether to disable the second application program.

* * * * *